(12) United States Patent
Shigetaka

(10) Patent No.: US 7,151,227 B2
(45) Date of Patent: Dec. 19, 2006

(54) ELECTROSTATIC CAPACITIVE TOUCH PAD

(75) Inventor: Hiroshi Shigetaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 180 days.

(21) Appl. No.: 10/872,312

(22) Filed: Jun. 18, 2004

(65) Prior Publication Data
US 2004/0256147 A1    Dec. 23, 2004

(30) Foreign Application Priority Data
Jun. 23, 2003    (JP)    ............... 2003-178142

(51) Int. Cl.
G09G 5/00    (2006.01)
(52) U.S. Cl. ............... 174/254; 361/760; 345/173
(58) Field of Classification Search ............... 174/254; 361/760; 345/173
See application file for complete search history.

(56) References Cited
U.S. PATENT DOCUMENTS
6,677,670 B1 *    1/2004    Kondo ............... 257/686

2003/0052867 A1 *    3/2003    Shigetaka et al.

FOREIGN PATENT DOCUMENTS
JP    2003-99185    4/2003

* cited by examiner

Primary Examiner—Kamand Cuneo
Assistant Examiner—Yuriy Semenenko
(74) Attorney, Agent, or Firm—Brinks Hofer Gilson & Lione

(57) ABSTRACT

On a surface of a film substrate made of an insulating synthetic resin, which is formed by connecting an approximately quadrangular first film substrate and an approximately quadrangular second film substrate through a bent portion, a ground electrode formed to cover at least a part of the second film substrate, and a first electrode layer formed of one of the wiring patterns on a part of the first film substrate are formed. An insulating film made of an insulating resin is formed on the first electrode layer, a second electrode layer formed of the other of the wiring patterns is formed on a surface corresponding to the part of the first film substrate of the insulating film, and the film substrate, the first electrode layer and the insulating film are bent in the bent portion such that the rear surfaces of the film substrate face each other.

3 Claims, 5 Drawing Sheets

ELECTROSTATIC CAPACITIVE TOUCH PAD

This application claims the benefit of priority to Japanese Patent Application No. 2003-178142, herein incorporated by reference.

BACKGROUND OF THE INVENTION

1. Field of the Invention

The present invention relates to an electrostatic capacitive touch pad used, for example, as a pointing device of a personal computer, and more specifically, to a touch pad which is capable of ensuring flexibility, and stabilizing a connection with a ground electrode on a product and a potential of a shield layer.

2. Description of the Related Art

The conventional touch pad has a film substrate made of an insulating synthetic resin sheet such as PET (polyethyleneterephthalate) serving as a detection substrate. On one side of the film substrate, an extension portion protruding to one side is formed. On the film substrate, an X electrode layer and a Y electrode layer are formed as two types of wiring patterns, thereby detecting an electrostatic capacity.

In more detail, an X electrode layer is formed on a bottom surface of the film substrate. The X electrode layer has an X direction driving electrode in which a plurality of X electrodes is formed with a predetermined spacing in an X direction. Further, one end of each X electrode is formed to extend to the extension portion. Moreover, a dummy electrode is formed between each pair of adjacent X electrodes.

Further, on a surface on which the X direction driving electrode of the film substrate is formed, a ground electrode is formed to extend to the extension portion along the circumferential portion of the film substrate. Moreover, between the X direction driving electrode and the ground electrode, an X switching electrode comprising a plurality of electrodes is formed.

On a surface of each electrode, an insulating film formed by coating or printing an insulating resin is provided, and a plurality of through holes is formed in the insulating film.

On a surface of the insulating film, a Y electrode layer, in which, in a direction perpendicular to the X direction driving electrode, a plurality of Y electrodes is formed and a Y direction driving electrode is formed, is arranged. Further, one end of some of the Y electrodes is formed to extend to a position of a predetermined through hole from both sides of an X direction.

Further, on the same layer as that on which the Y direction driving electrode of the insulating film is formed, a detection electrode is formed. The detection electrode comprises two comb-shaped electrodes, and each of which has a tip formed in a reverse direction to each other. Further, each comb-shaped electrode is collected to one electrode in a center of Y direction and extends to a predetermined position of a through hole.

In addition, on the entire surface that includes the Y direction driving electrode, an insulating film made of the same material as that of the insulating film is formed. Further, to a top surface of the film substrate, a surface sheet is attached by an adhesive.

An end of each Y electrode formed in the Y electrode layer is connected to the X switching electrode through a predetermined through hole formed in the insulating film.

Further, an end portion formed to extend from the detection electrode which is formed in the Y electrode layer is connected to the X switching electrode through a predetermined through hole.

In addition, an end portion of each connected electrode is formed to extend to an end portion of the extension portion of the film substrate in the Y electrode layer.

Then, an end portion of each electrode formed to extend to the end portion of the extension portion of the film substrate is connected to a conductive portion of a control circuit substrate (for example, see Japanese Unexamined Patent Application Publication No. 2003-99185 (see pages 3 to 5 and FIGS. 1 to 4)).

In the touch pad formed in such a manner, an aluminum sheet is attached to the bottom surface of the film substrate, that is, a rear surface, and the touch pad is arranged to be connected to a ground electrode such as a keyboard of a PC (personal computer).

In addition, in the touch pad connected to the keyboard, by touching the surface sheet with a conductor such as a finger, an electrostatic capacity between each X electrode and each Y electrode is varied at the touched location, and X coordinate data and Y coordinate data are detected. Then, the detected output is amplified through an amplifier and is converted into a digital signal by an A/D converter. Further, a control unit performs a predetermined calculation, and then a control is conducted in a device such as a PC.

However, the conventional touch pad is likely to generate a connection failure, then causes the potential of the shield layer to be unstable, thereby adversely affecting the operation performance of the touch pad, since the shielding aluminum sheet was attached to the rear surface of the resultant touch pad and the aluminum sheet was connected to the ground electrode of the keyboard or the like, when it is arranged in the keyboard or the like of a PC. In addition, there was a problem in that the aluminum sheet is attached to the rear surface of the touch pad and then the flexibility of the touch pad is impaired.

SUMMARY OF THE INVENTION

Accordingly, the present invention is designed to solve the above problems, and it is an object of the present invention to provide an electrostatic capacitive touch pad which is capable of making a stable connection to a ground electrode and stabilizing a potential of a shield layer so as to ensure stable operation performance of the touch pad, without impairing flexibility.

To achieve the above-mentioned object, the touch pad according to an embodiment of the present invention has a surface of a film substrate made of an insulating synthetic resin which is formed by connecting an approximately quadrangular first film substrate and an approximately quadrangular second film substrate through a bent portion, on which a ground electrode formed so as to cover at least a part of the second film substrate and a first electrode layer formed of one of the wiring patterns on a part of the first film substrate are formed, an insulating film made of an insulating resin is formed on the first electrode layer, a second electrode layer formed of the other of the wiring patterns is formed on a surface corresponding to the part of the first film substrate of the insulating film, and the film substrate, the first electrode layer and the insulating film are bent in the bent portion such that the rear surfaces of the film substrate face each other.

By adopting such a constitution, two types of wiring patterns, specifically, for example, an X electrode layer and Y electrode layer are formed through an insulating film on a surface of the first film substrate. The second film substrate is bent and attached to a rear surface side of the first film substrate by the bent portion. The shield layer is formed by the ground electrode formed on the second film substrate. Therefore, since there is no need to form the shield layer by attaching the aluminum sheet to the rear surface of the touch pad as in the conventional art, a stable connection to the ground electrode of a keyboard or the like is attained, and the potential of the shield layer is stabilized. As a result, the operation performance of the touch pad can be stabilized. In addition, the flexibility of the touch pad can be secured.

Further, the touch pad according to an embodiment of the present invention has a ground electrode surrounding one of wiring patterns is formed in a circumferential portion of the first film substrate and electrically connected to the ground electrode formed on the second film substrate through the bent portion.

By adopting such a constitution, it can prevent an effect to the wiring patterns formed on a surface of the first film substrate due to a static electricity generated in the vicinity of the touch pad arranged in the keyboard or the like, thereby stabilizing the operation performance of the touch pad.

DESCRIPTION OF THE PREFERRED EMBODIMENTS

Hereinafter, embodiments of a touch pad according to the present invention will be described in detail with reference to the accompanying drawings.

Figure 1:
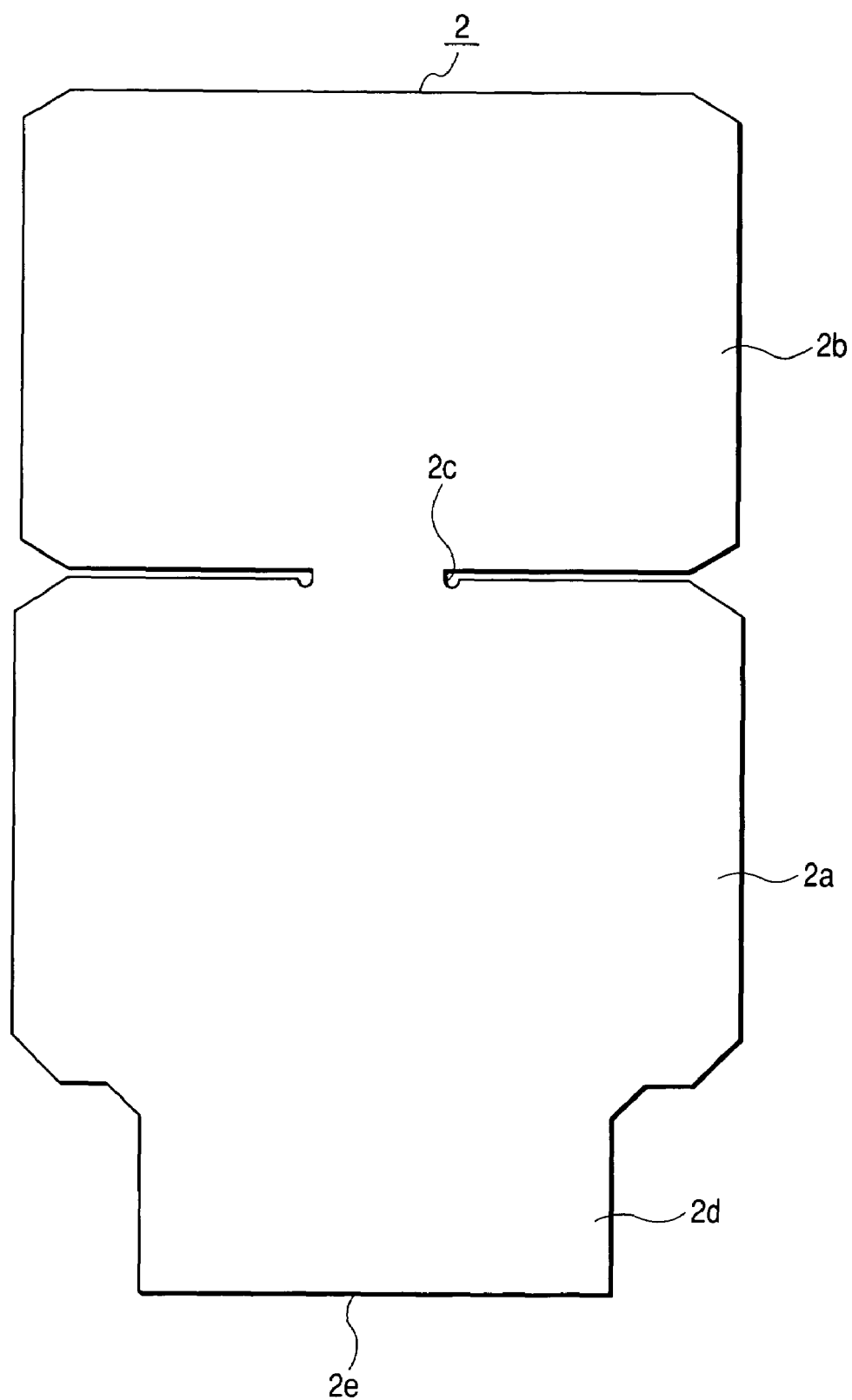
FIG. 1 is a plan view showing an embodiment of a film substrate of a touch pad according to the present invention.
Figure 2:
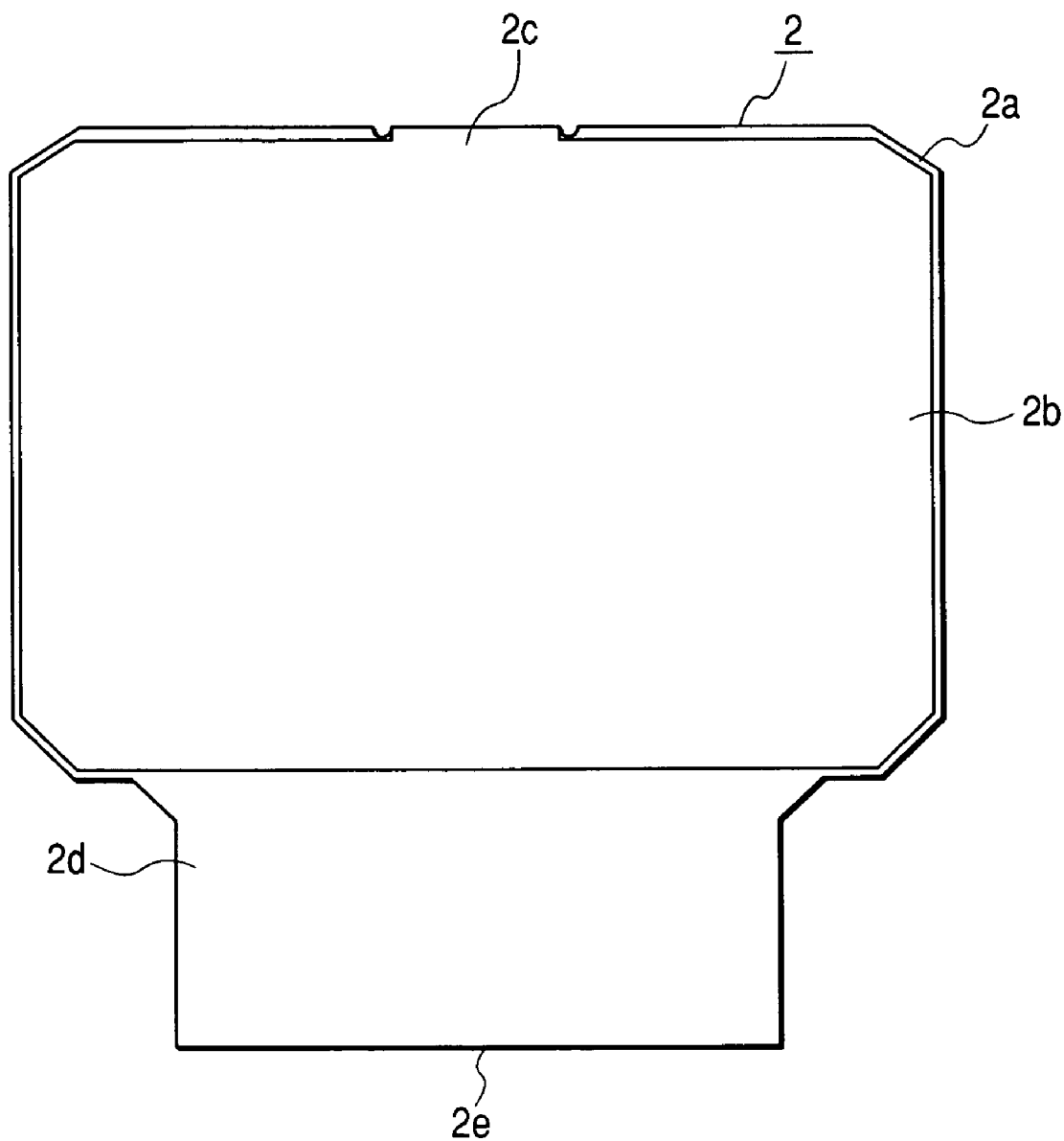
FIG. 2 is a rear view showing the bent film substrate of the embodiment.
Figure 3:
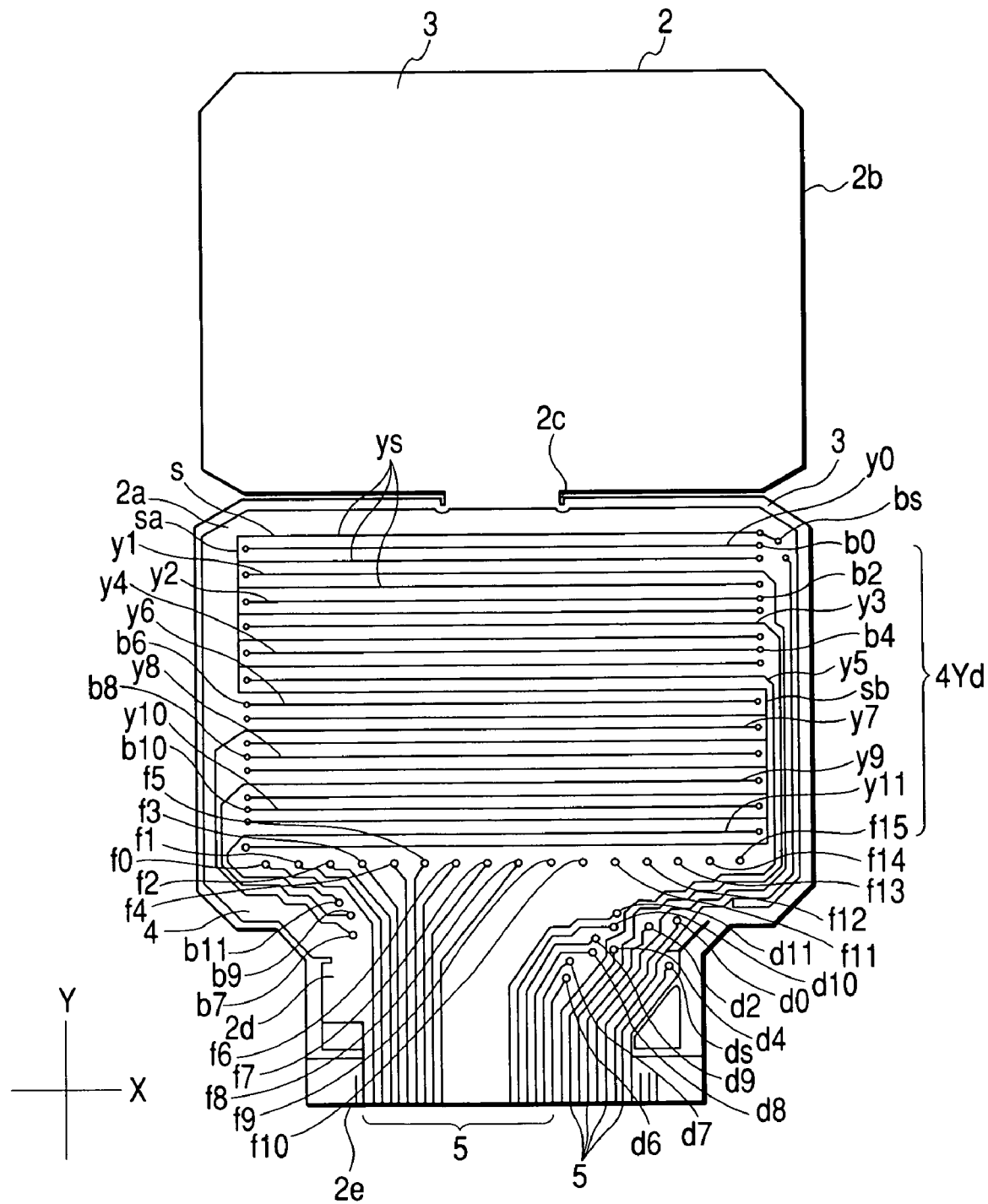
FIG. 3 is a circuit wiring view showing a Y electrode layer of one type of wiring pattern.
Figure 4:
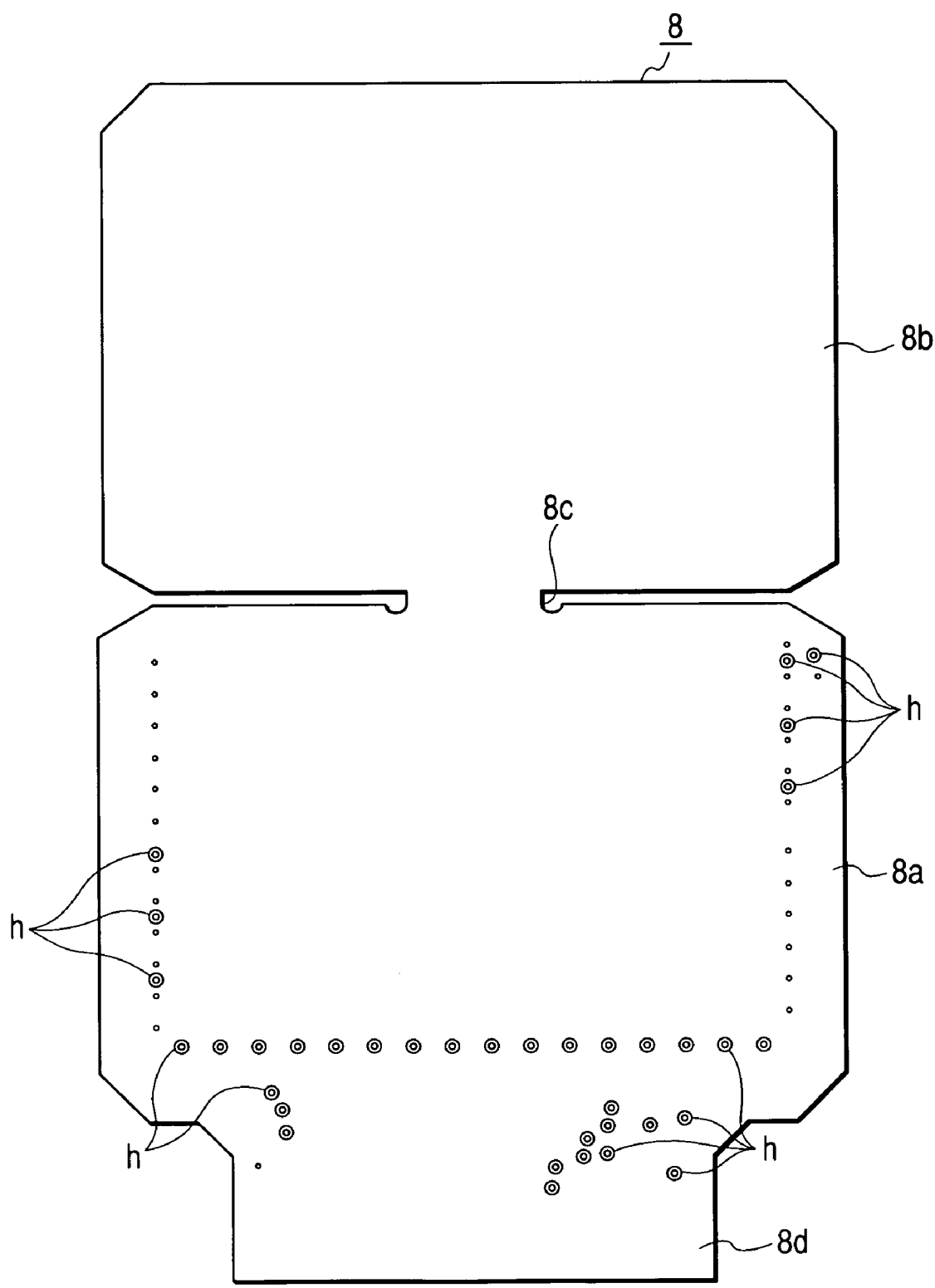
FIG. 4 is a plan view showing an insulating film in the embodiment.
Figure 5:
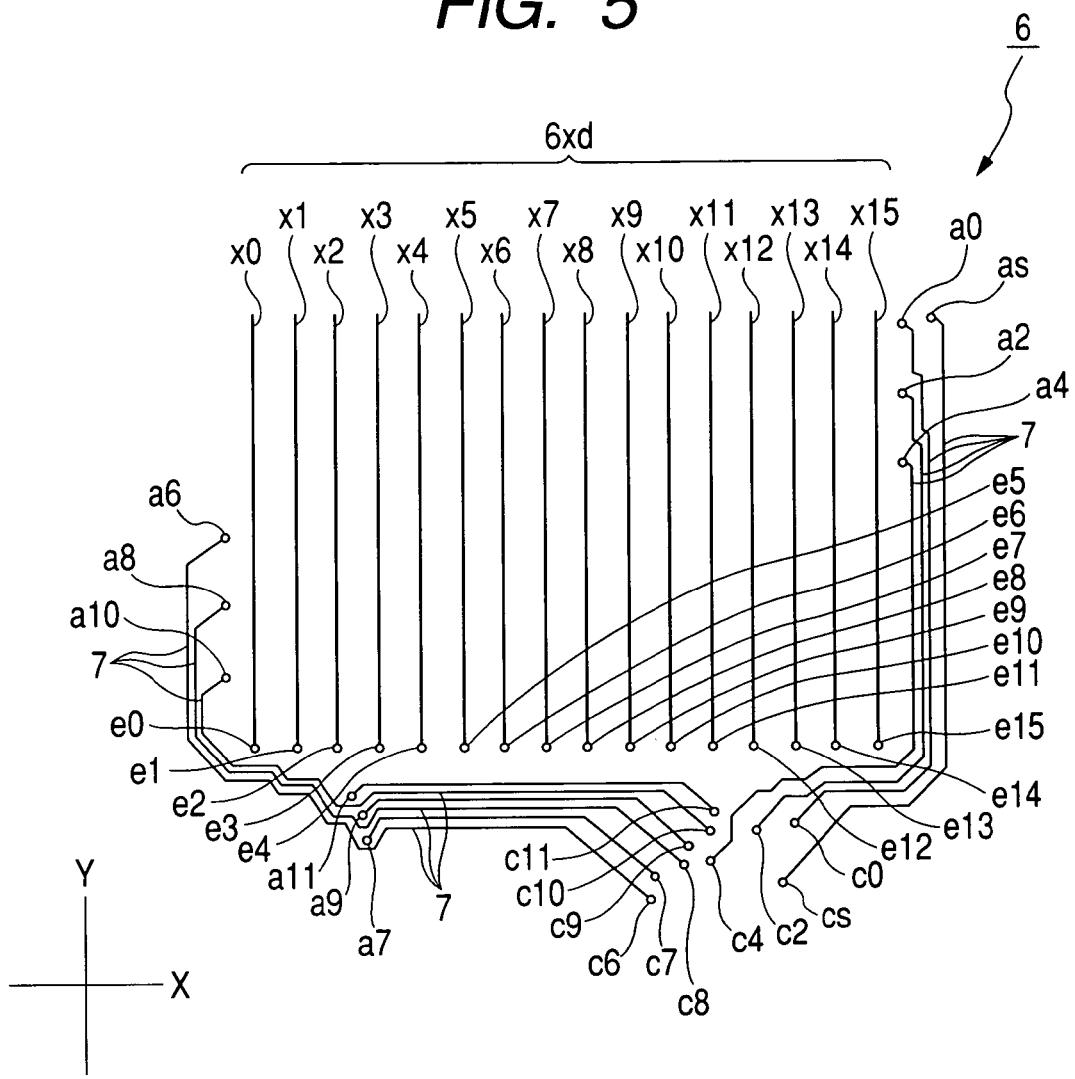
FIG. 5 is a view showing only circuit wiring lines of an X electrode layer of the other wiring pattern.
Figure 6:
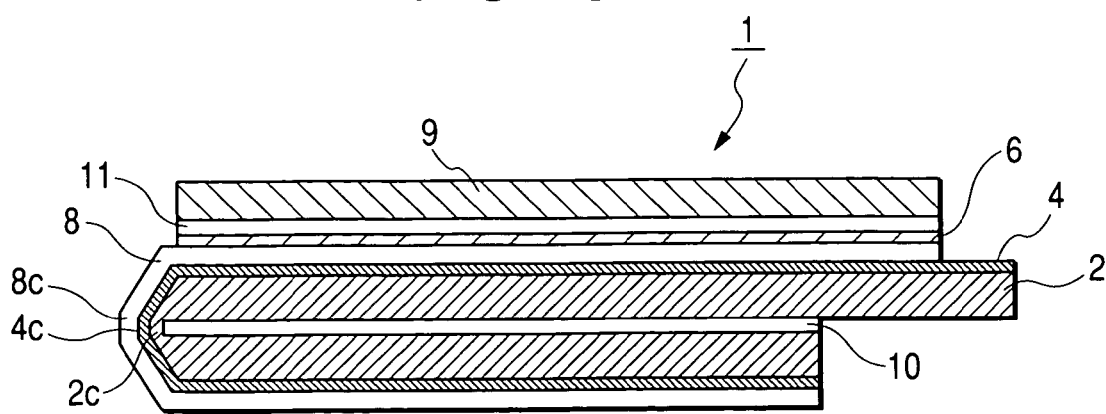
FIG. 6 is an exploded perspective view of the touch pad in the embodiment.

FIG. 1 is a plan view showing an embodiment of a film substrate of a touch pad according to the present invention. FIG. 2 is a rear view showing the bent film substrate of the embodiment. FIG. 3 is a circuit wiring view showing a Y electrode layer of one type of wiring pattern. FIG. 4 is a plan view showing an insulating film in the embodiment. FIG. 5 is a view showing only circuit wiring lines of an X electrode layer of the other wiring pattern. FIG. 6 is an exploded perspective view of the touch pad in the embodiment.

A shield layer of a touch pad 1 according to the present embodiment is formed by connecting each longitudinal side of an approximately quadrangular first film substrate 2a and an approximately quadrangular second film substrate 2b through a bent portion 2c to form a film substrate 2 made of an insulating synthetic resin such as PET (polyethyleneterephthalate), as shown in FIG. 1. Moreover, the second film substrate 2b is formed to have an area smaller than that of the first film substrate 2a such that it may not be seen from the first film substrate 2a when bent, as shown in FIG. 2. Further, on the side opposing the side of the first film substrate 2a on which the bent portion 2c is formed, an extension portion 2d protruding to a side direction is formed.

As shown in FIG. 3, a Y electrode layer 4 is formed, which includes a Y direction driving electrode 4Yd, which has a plurality (12) of Y electrodes y0, y1, . . . , y10, and y11 formed in a Y direction; a plurality of Y switching electrodes 5, which are formed on a surface of the first film substrate 2a of the film substrate 2; and an electrostatic countermeasure ground electrode 3 made of silver formed by printing on an entire surface of the second film substrate 2b and the bent portion 2c and a circumferential portion reaching an end portion 2e of the extension portion 2d of the first film substrate 2a. Further, in the Y electrode layer 4, a detection electrode S is formed. The detection electrode S comprises comb-shaped electrodes sa and sb, each of which has a tip formed in a reverse direction to each other, and in which each electrode ys and each Y electrode y are alternately arranged, are collected in one electrode in a center of Y direction and extend to a predetermined through hole h as described below. Moreover, each Y electrode y0, y1, . . . , y10, and y11, each Y switching electrode 5 and each electrode ys are formed using a silver paste or silver-based paste using a screen printing method.

Then, on a surface of the Y electrode layer 4, an insulating film 8 made of an insulating resin is formed. As shown in FIG. 4, the insulating film 8 is formed in almost the same shape as that of the film substrate 2. The approximately quadrangular insulating films 8a and 8b are connected by a bent portion 8c. On the side opposing the side on which the bent portion 8c of the insulating film 8a is formed, an extension portion 8d protruding to a side direction is formed. Further, in the insulating film 8a, a plurality (36) of through holes h is formed. Moreover, the extension portion 8d is formed shorter than that of the extension portion 2d of the first film substrate 2a.

Further, as shown in FIG. 5, on a surface of the insulating film 8a, an X electrode layer 6 is formed, which includes: an X direction driving electrode 6Xd, which has a plurality (16) of X electrodes x0, x1, . . . , x14, and x15 formed in an X direction; and a plurality of X switching electrodes 7. Moreover, each X electrode x0, x1, . . . , x14, and x15 and each X switching electrode 7 are formed using a silver paste or a silver-based paste using a screen printing method.

Then, in the embodiment, each electrode formed in the X electrode layer 6 is led to a surface on which the Y electrode layer 4 is formed, and each electrode is collected in the end portion 2e of the extension portion 2d. A fabricating means thereof will be described below.

Each end portion b0, b2, b4, b6, b8, and b10 of the Y electrodes y0, y2, y4, y6, y8, and y10 is connected to each end portion a0, a2, a4, a6, a8, and a10 of the X switching electrodes 7 through a predetermined through hole h formed in the insulating film 8a. Further, each end portion c0, c2, c4, c6, c8, and c10 formed on the opposing side of each end portion a0, a2, a4, a6, a8, and a10 of the X switching electrodes 7 is connected to each opposing end portion d0, d2, d4, d6, d8, and d10 of the Y switching electrodes 5 through a predetermined through hole h, and the Y switching electrodes 5 are formed to extend to the end portion 2e of the first film substrate 2a.

Further, each end portion b7, b9, and b11 of the Y electrodes y7, y9, and y11 is connected to each end portion a7, a9, and a11 of the X switching electrodes 7 through a predetermined through hole h, and each end portion c7, c9, and c11 formed on the opposing side of each end portion a7, a9, and a11 of the X switching electrode 7 is connected to each opposing end portion d7, d9, and d11 of the Y switching electrodes 5 through a predetermined through hole h. Each of the Y switching electrodes 5 is formed to extend to the end portion 2e of the first film substrate 2a. Moreover, each of the Y electrodes y1, y3, and y5 and the ground electrode 3 are formed to extend to the end portion 2e of the first film substrate 2a as it is. Further, an end portion bs of the detection electrode S is connected to each end portion as of the X switching electrodes 7 through a predetermined through hole h, and an end portion cs formed on the opposing side of each end portion as of the X switching electrodes 7 is connected to each end portion ds of the Y switching electrodes 5 through a predetermined through hole. Each of the Y switching electrodes 5 is formed to extend to the end portion 2e of the first film substrate 2a.

Further, each end portion e0, e1, . . . , e14, and e15 of the X electrodes x0, x1, . . . , x14, and x15 is connected to each end portion f0, f1, . . . , f14, and f15 of the Y switching electrodes 5 through a predetermined through hole, and each of the Y switching electrodes 5 is formed to extend to the end portion of the first film substrate 2a.

By doing so, all electrodes in the Y electrode layer 4 and the X electrode layer 6 are collected in the end portion 2e of the extension portion 2d of the first film substrate 2a.

Further, as shown in FIG. 6, an adhesive 10 such as an adhesive sheet is adhered to the rear surface of the second film substrate 2b of the film substrate 2, and the second film substrate 2b is bent from the bent portion 2c to the rear side and adhered to the rear surface of the first film substrate 2a.

Further, a surface sheet 9, which becomes a touching part of a finger or a pen in operation of a user, is adhered to the surface of the X electrode layer 6 by an adhesive 11 such as a polyester adhesive tape. The surface sheet 9 comprises an approximately quadrangular film substrate made of an insulating synthetic resin, and an extension portion protruding to a side direction is formed on its one side. Moreover, the film substrate 9a is formed to have the same size as that of the first film substrate 2a, and the extension portion 9b is shorter than that of the extension portion 2d and has the same length as that of the extension portion 8d of the insulating film 8. Further, the extension portion 9b is formed to expose each electrode collected in the end portion 2e of the extension portion 2d.

Then, each electrode collected in the end portion 2e is connected to a conductive portion (not shown) formed in a control circuit board (not shown) by an insulating-thermosetting bonding agent, in which conductive particles such as an epoxy resin are not contained.

The touch pad 1 having the above structure detects by the X direction driving electrode 6Xd, the Y direction driving electrode 4Yd and the detection electrode S.

In other words, in a state that an electric field of a desired potential is applied between all of the X direction driving electrode 6Xd (the X electrodes x0, x1, . . . , x14, and x15) and the Y direction driving electrode 4Yd (the Y electrodes y0, y1, . . . , y10, and y11), when a conductor such as a finger is touched to the surface sheet 9, an electrostatic capacity between the X direction driving electrode 6Xd and the Y direction driving electrode 4Yd at the touched location is varied.

When acquiring X coordinate data, the X direction driving electrode 6Xd is selected by two in a bind, and a detection output corresponding to a variation in an electrostatic capacity between the X direction driving electrode 6Xd and the detection electrode S is acquired. When acquiring Y coordinate data, the Y direction driving electrode 4Yd is selected by two in a bind, and a detection output corresponding to a variation in an electrostatic capacity between the Y direction driving electrode 4Yd and the detection electrode S is acquired. Then, the output from all the X direction driving electrode 6Xd and the output from all the Y direction driving electrode 4Yd are alternately acquired in a time sharing method.

The detection outputs acquired in such a manner are amplified in an amplifier (not shown), converted into digital signal in an A/D converting unit (not shown), and then supposed to be calculated in a control unit (not shown). The calculation results are transmitted to a PC main body (not shown), and then the PC main body performs control in accordance with the calculation results.

As described above, according to the touch pad of the present invention, the ground electrode 3 formed on the entire surface of the second film substrate 2b of the film substrate 2 is adhered to the rear surface of the first film substrate 2a and shields it. As a result, a connection of a ground electrode of a keyboard or the like of a PC and the ground electrode 3 can be stabilized, thereby stabilizing a potential of the shield and stabilizing the operation performance of the touch pad 1. Further, even when connecting to the ground electrode of the keyboard or the like of the PC as in the conventional art, it is not necessary to attach and connect an aluminum sheet to the rear surface of the resultant touch pad. As a result, the flexibility of the touch pad can be secured.

Moreover, the present invention is not limited to the embodiment as described above, and can have various modifications, if necessary. While, in the present embodiment, the Y electrode layer 3 is formed on the surface of the first film substrate 2a, the insulating film 8 is formed on the surface of the Y electrode layer 3, the X electrode layer 6 is formed on the surface of the insulating film 8, and each electrode is connected to each other in each through hole h and collected in the end portion 2e of the extension portion 2d of the first film substrate 2a, the X electrode layer 6 may be formed on the surface of the first film substrate 2a, the insulating film 8 may be formed on the surface of the X electrode layer 6, the Y electrode layer 3 may be formed on the surface of the insulating film 8, and each electrode may be connected to each other in each through hole h and colleted in the end portion 2e of the extension portion 2d of the first film substrate 2a, for example. Further, while, in the present embodiment, the first film substrate 2a and the second film substrate 2b are connected by the bent portion 2c in one side of each longitudinal direction, the side connected by the bent portion 2c is not limited to the side of the longitudinal direction.

As described above, according to the present invention, the shield layer is formed by bending the second film substrate, on the entire surface of which the ground electrode is formed, thereby stabilizing the connection of a ground electrode of a keyboard or the like of a PC and the potential of the shield layer. Further, with the ground electrode formed in the circumferential portion of the first film substrate, an effect to the wiring patterns due to the static electricity occurring in the vicinity of the touch pad can be prevented, thereby stabilizing the operation performance of the touch pad. Further, since it is not necessary to form the shield layer by attaching an aluminum sheet to the rear surface of the touch pad, the flexibility of the touch pad can be secured.

The invention claimed is:

1. An electrostatic capacitive touch pad for detecting an electrostatic capacity and having two types of wiring patterns formed on a substrate, wherein, on a surface of a film substrate made of an insulating synthetic resin which is formed by connecting an approximately quadrangular first film substrate and an approximately quadrangular second film substrate through a bent portion, a ground electrode layer formed of a shield layer and formed to cover at least a surface portion of the second film substrate, and a first electrode layer formed of a first of the wiring patterns on a part of the first film substrate are formed, wherein an insulating film made of an insulating resin is formed on the first electrode layer, wherein a second electrode layer formed of a second of the wiring patterns is formed on a surface corresponding to the part of the first film substrate of the insulating film, and wherein the film substrate, the first electrode layer, and the insulating film are bent in the bent portion such that rear surfaces of the film substrate face each other.

2. The touch pad according to claim 1, wherein, on a circumferential portion of the first film substrate, a ground electrode surrounding the first of the wiring patterns is formed, and the ground electrode is electrically connected to the shield layer formed on the second film substrate through the bent portion.

3. The touch pad according to claim 2, wherein the shield layer is formed on the entire surface part of the second film substrate and a surface of the bent portion.

* * * * *